United States Patent [19]

Frye et al.

[11] Patent Number: 5,775,102
[45] Date of Patent: Jul. 7, 1998

[54] POWER-ASSISTED HYDRAULIC STEERING SYSTEM

[75] Inventors: David E. Frye, North Mankato; Frederick W. Cords, Le Sueur, both of Minn.

[73] Assignee: Commercial Intertech Corp., Youngstown, Ohio

[21] Appl. No.: 763,760

[22] Filed: Dec. 11, 1996

Related U.S. Application Data

[63] Continuation of Ser. No. 447,094, May 22, 1995, abandoned.

[51] Int. Cl.$^6$ ............................................. F16D 31/02
[52] U.S. Cl. ................................. 60/431; 91/467
[58] Field of Search ..................... 91/378, 383, 387, 91/467; 60/431, 432, 368, 423, 433, 434; 180/403, 417

[56] References Cited

U.S. PATENT DOCUMENTS

| | | | |
|---|---|---|---|
| Re. 25,126 | 2/1962 | Charlson | 121/41 |
| 1,358,454 | 11/1920 | McLeod | 60/432 X |
| 2,634,709 | 4/1953 | Fageol | 91/378 |
| 2,751,752 | 6/1956 | Metcalf | 91/378 X |
| 2,946,193 | 7/1960 | Chittenden | 91/378 X |
| 3,424,260 | 1/1969 | Stone et al. | 180/66 |
| 3,991,846 | 11/1976 | Chichester et al. | 60/433 X |
| 4,056,160 | 11/1977 | Abels et al. | 60/431 X |
| 4,070,857 | 1/1978 | Wible | 60/431 X |
| 4,100,739 | 7/1978 | Shaffer | 60/413 |
| 4,184,333 | 1/1980 | Blaha et al. | 60/420 |
| 4,417,640 | 11/1983 | Abe et al. | 180/142 |
| 4,449,365 | 5/1984 | Hancock | 60/422 |
| 4,892,494 | 1/1990 | Ferguson . | |
| 4,976,639 | 12/1990 | Rawlings . | |
| 5,028,851 | 7/1991 | Wilder | 318/2 |
| 5,057,043 | 10/1991 | Sugimoto . | |
| 5,074,193 | 12/1991 | Hundertmark . | |
| 5,127,856 | 7/1992 | Kabuto . | |
| 5,146,745 | 9/1992 | Doetsch . | |
| 5,188,051 | 2/1993 | Huber . | |
| 5,213,527 | 5/1993 | Fetchko . | |
| 5,228,405 | 7/1993 | Merten . | |
| 5,241,894 | 9/1993 | Hundertmark . | |
| 5,330,375 | 7/1994 | Tsujii et al. | 440/61 |
| 5,350,326 | 9/1994 | Funami . | |

(List continued on next page.)

OTHER PUBLICATIONS

Murray, Charles J., "Power Steering Performs Only On Demand," Design News, Jun. 8, 1992, pp. 123–124.

*Primary Examiner*—Hoang Nguyen
*Attorney, Agent, or Firm*—Faegre & Benson LLP

[57] ABSTRACT

A power-assisted hydraulic steering system for use in connection with a vehicle having a steering linkage which couples a steering wheel to a vehicle steering actuator, an electrically actuated hydraulic pump, and a tank of hydraulic fluid. The steering system includes a boost cylinder connected to the steering actuator, a hydraulic spool valve fluidly coupling the pump and tank to the boost cylinder, and a switch coupled to the pump. A spool which is mechanically coupled to the steering actuator is mounted within the valve for reciprocal motion between neutral, extended and retracted positions, and is biased to the neutral position by a centering spring which establishes a power-assist threshold. The switch senses the position of the spool, and switches the pump on when the spool is in the extended and retracted positions. When steering forces applied to the steering actuator by rotation of the steering wheel are less than the power-assist threshold, the spool will remain in the neutral position with the pump switched off and the valve fluidly isolating the pump and tank from the boost cylinder. When steering forces applied to the steering actuator by rotation of the steering wheel are greater than the power-assist threshold, the linkage housing forces the spool to the retracted or extended position depending on the direction of the rotation, thereby switching the pump on and driving the boost cylinder and steering actuator through a power-assist retraction or extension stroke.

27 Claims, 4 Drawing Sheets

U.S. PATENT DOCUMENTS

| | | |
|---|---|---|
| 5,376,029 | 12/1994 | Entringer . |
| 5,387,142 | 2/1995 | Takayanagi . |
| 5,392,690 | 2/1995 | Hundertmark . |
| 5,427,045 | 6/1995 | Fetchko . |
| 5,427,555 | 6/1995 | Merten . |
| 5,427,556 | 6/1995 | Ishikawa . |
| 5,447,456 | 9/1995 | Nakayasu . |
| 5,505,641 | 4/1996 | Onoue . |

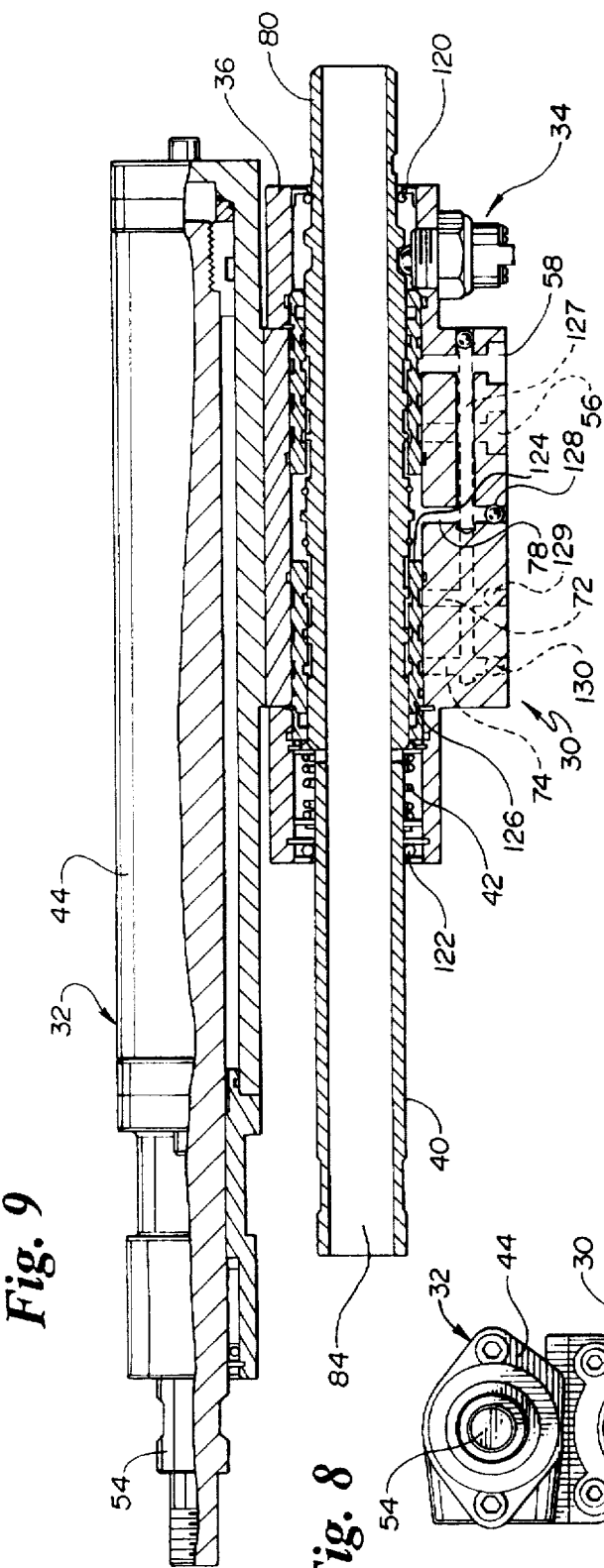
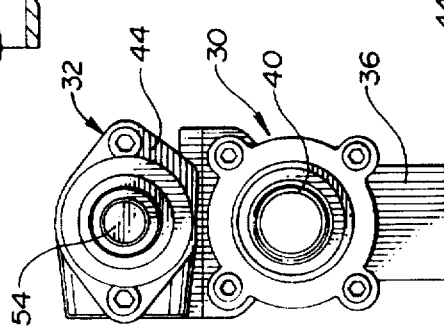
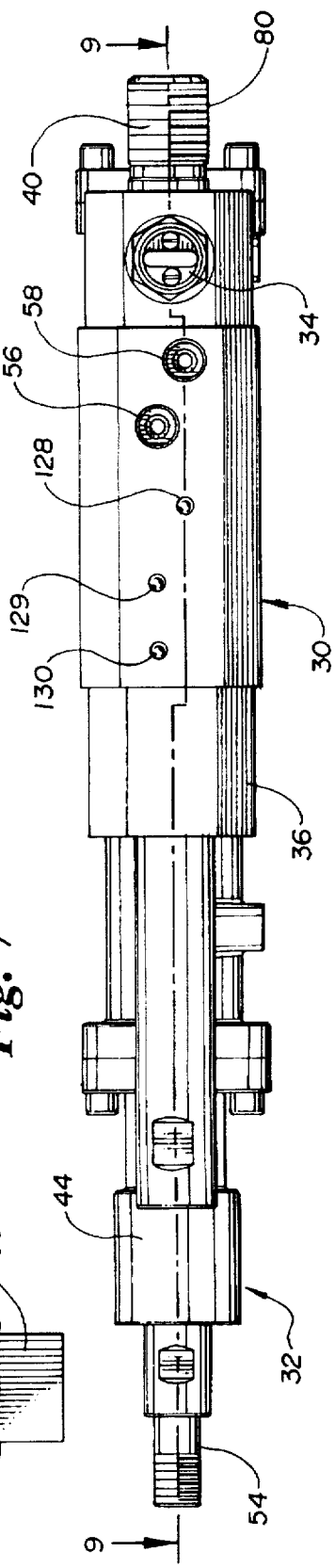
Fig. 9
Fig. 8
Fig. 7

POWER-ASSISTED HYDRAULIC STEERING SYSTEM

This application is a continuation of U.S. application Ser. No. 08/447,094 filed on May 22, 1995, now abandoned.

BACKGROUND OF THE INVENTION

1. Field of the Invention

The present invention relates generally to power-assisted hydraulic systems. In particular, the present invention is a power-assisted hydraulic steering system for boats and other vehicles.

2. Description of the Related Art

Power steering systems are well known and in widespread use in cars, trucks, boats and other vehicles. One hydraulic spool valve and cylinder set used in power steering systems for marine applications is commercially available from Eaton Technologies of Eaton Rapids, Mich. This Eaton valve and cylinder set is configured for use in a boat having a linkage cable which extends between the steering wheel and tiller. A rigid rod on the end of the cable is pivotally connected to both the tiller and the valve spool. The cylinder rod is also connected to the tiller. Pressurized hydraulic fluid is provided to the spool valve by a pump which is driven by the boat engine. When the steering wheel is rotated in such a manner as to turn the boat in one direction, the cable mechanically moves the tiller in a first turn direction and simultaneously forces the valve spool to a first actuated position. In response, the valve causes the cylinder to move the tiller in the first turn direction, thereby providing hydraulic steering forces in addition to the mechanical forces provided by the cable. Similarly, when the steering wheel is rotated to turn the boat in a second and opposite direction, the cable mechanically moves the tiller in a second turn direction and simultaneously forces the valve spool to a second actuated position. The valve then causes the cylinder to move the tiller in the second turn direction to provide hydraulic steering forces in addition to the forces provided by the cable.

SUMMARY OF THE INVENTION

The present invention is a power-assisted hydraulic system for use in connection with a linkage mechanically coupled to an actuated member, a hydraulic pump and a tank of hydraulic fluid coupled to the pump. One embodiment of the power-assisted hydraulic system includes a switch electrically interconnected to the pump, a hydraulic boost cylinder, and a hydraulic spool valve. The switch is responsive to forces applied to the actuated member by the linkage, and actuates the pump to initiate hydraulic fluid flow when the forces applied to the actuated member by the linkage are greater than a power-assist threshold. The hydraulic boost cylinder has a rod configured for interconnection to the actuated member, a base end port and a rod end port. The hydraulic spool valve comprises a valve body and a spool. The valve body includes a spool chamber, a pump port and passage for fluidly coupling hydraulic fluid from the pump to the spool chamber, a base end port and passage for fluidly coupling hydraulic fluid between the spool chamber and the base end port of the boost cylinder, and a rod end port and passage for fluidly coupling hydraulic fluid between the spool chamber and the rod end port of the boost cylinder. The spool is responsive to forces applied to the actuated member by the linkage, and moves between a neutral position and first and second actuated positions when the forces applied to the actuated member are greater than the power-assist threshold. The spool and spool chamber are configured to fluidly couple the pump port and passage to the rod end port and passage and cause the boost cylinder to be driven in a first stroke direction when the spool is forced to the first actuated position. The spool and spool chamber are configured to fluidly couple the pump port and passage to the base end port and passage and cause the boost cylinder to be driven in a second stroke direction when the spool is forced to the second actuated position.

In another embodiment of the hydraulic system the valve body further includes a tank port and passage for fluidly coupling hydraulic fluid from the spool chamber to the tank. The spool and spool chamber are configured to fluidly couple the base end port and passage to the tank port and passage when the spool is forced to the first actuated position. The spool and spool chamber are configured to fluidly isolate the tank port and passage from the base end port and passage and the rod end port and passage, and to fluidly couple the rod end port and passage to the pump port and passage in a regenerative hydraulic circuit, when the spool is forced to the second actuated position. The spool and spool chamber are also configured to fluidly isolate the base end port and passage and the rod end port and passage from the pump port and passage and the tank port and passage when the spool is in the neutral position.

In yet another embodiment of the power-assisted hydraulic system the spool valve includes a centering spring for biasing the spool to the neutral position with the power-assist threshold force. The first and second actuated positions are on opposite sides of the neutral position. A switch is mounted to the valve body and electrically connected to the pump. The switch is responsive to the position of the spool within the spool chamber, and actuates the pump when the spool is in the first and second actuated positions. The hydraulic system is configured for use with a linkage mounted within a housing. The spool includes a bore through which the linkage can extend, and a mount for receiving an end of the housing. The reactive forces of the housing on the spool are proportional in magnitude to the forces applied to the actuated member by the cable. When the reactive forces of the housing on the spool are greater than the power-assist threshold force of the centering spring, the spool is forced to either its first or second actuated positions causing the boost cylinder to be driven in the first or second stroke directions, respectively.

BRIEF DESCRIPTION OF THE DRAWINGS

FIG. 7 is a detailed top view of one embodiment of a valve and hydraulic cylinder assembly in accordance with the present invention. FIG. 8 is an end view of the assembly shown in FIG. 7. FIG. 9 is a sectional side view of the assembly, taken along lines 9—9 in FIG. 7.

DETAILED DESCRIPTION OF THE PREFERRED EMBODIMENTS

Figure 1:
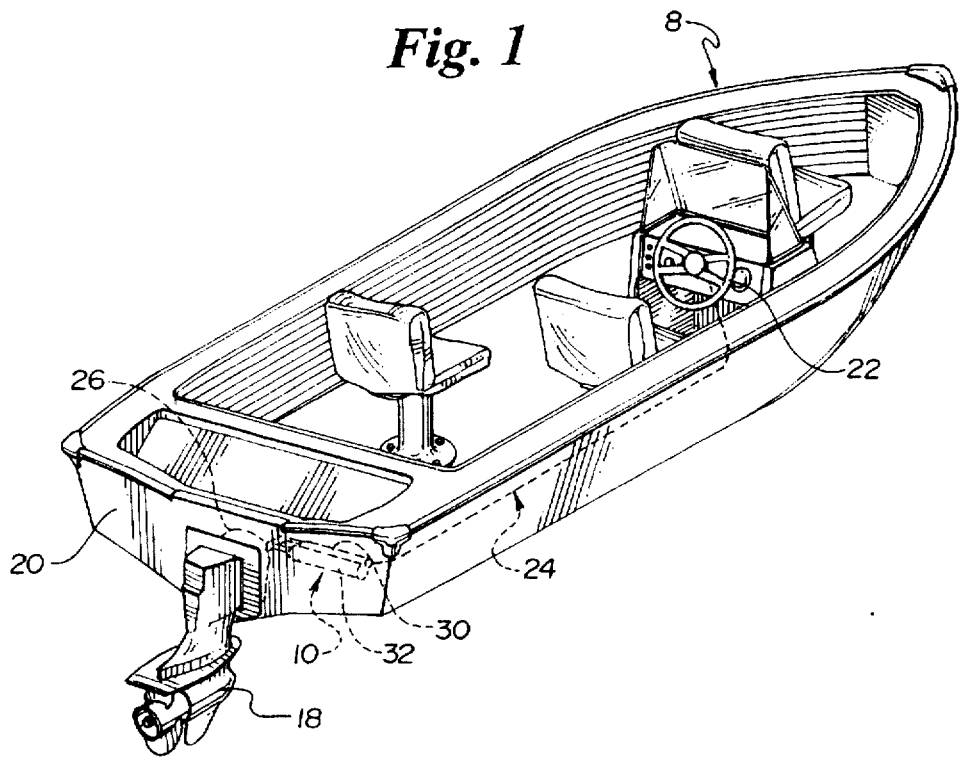
FIG. 1 is an illustration of a boat which includes a power-assisted hydraulic steering system in accordance with the present invention, with the hydraulic valve and cylinder shown in the neutral position.

A boat 8 (i.e., a vehicle) which includes a power-assisted hydraulic steering system 10 in accordance with the present invention is illustrated generally in FIG. 1. With the exception of hydraulic steering system 10 and its associated hydraulic pump and tank of hydraulic fluid (not shown in FIG. 1), boat 8 is conventional in design and includes a hull 16 with an outdrive unit 18 pivotally mounted to its stern 20. A driver steers the boat 8 by rotating steering wheel 22. Steering wheel 22 is coupled to outdrive unit 18 by a linkage assembly 24 and tiller 26 (i.e., an actuated member). The rotation of steering wheel 22 causes linkage assembly 24 to mechanically actuate tiller 26 in a conventional manner, and thereby move outdrive unit 18 through steering strokes. As described in greater detail below, power-assisted hydraulic system 10 applies power steering forces to tiller 26 that are separate from and in addition to the forces manually applied to the tiller by the operator through the use of steering wheel 22. These power-assist steering forces are applied by hydraulic system 10 whenever the forces applied to the tiller 26 by linkage assembly 24 are greater than a power-assist force threshold (i.e., on demand).

Figure 2:
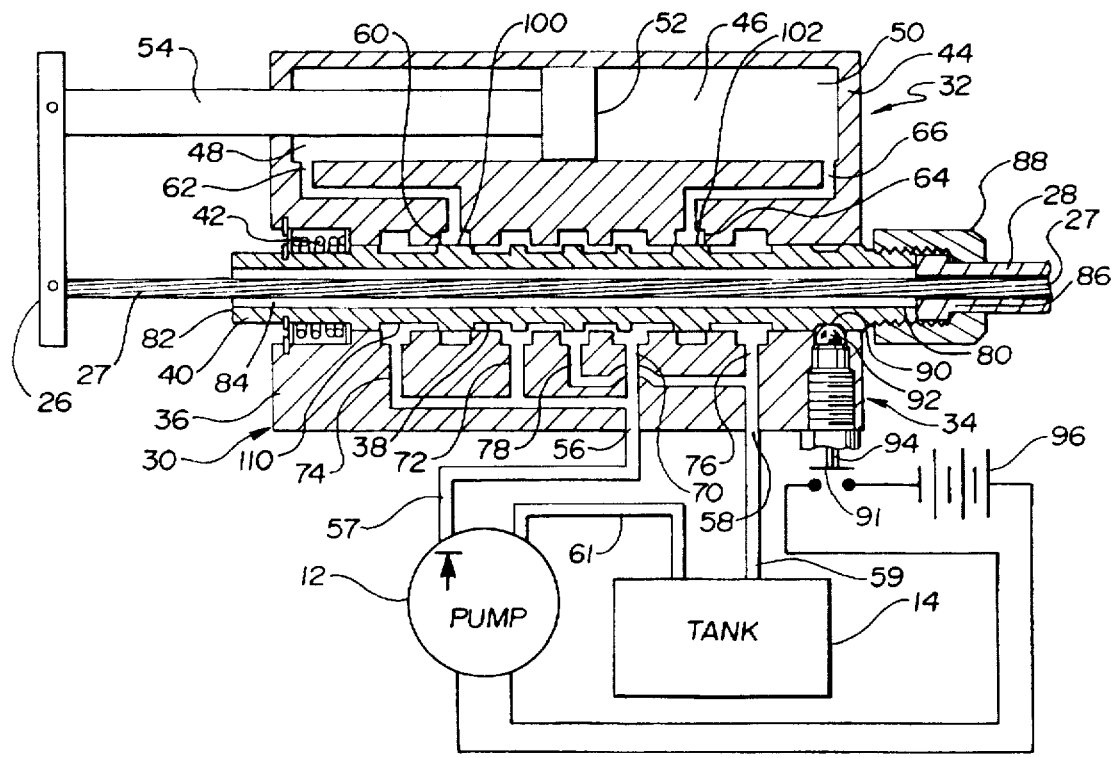
FIG. 2 is a schematic diagram of the hydraulic system shown in FIG. 1, illustrating the operation of the system when the valve is in the neutral position.

FIG. 2 is a detailed schematic sectional view of power-assisted hydraulic system 10 and its mechanical and electrical interfaces to pump 12, tank 14 of hydraulic fluid, battery 96 and tiller 26. As shown, hydraulic system 10 includes a hydraulic spool valve 30, double-acting hydraulic boost cylinder 32 and pump switch 34. Valve 30 includes a valve body 36 with a chamber 38 in which valve spool 40 is mounted for reciprocal motion between retracted (i.e., first) and extended (i.e., second) positions. Valve spool 40 is biased to a center or neutral position between the retracted and extended positions by centering spring 42. Centering spring 42 establishes the power-assist threshold force of hydraulic system 10. Boost cylinder 32 includes a cylinder body 44 with a chamber 46 having a rod end 48 and a base end 50 on opposite sides of piston 52. Piston 52 is mounted for reciprocal motion within chamber 46. Piston rod 54 extends from the rod end 48 of cylinder 32, and is pivotally mounted to tiller 26.

An inlet or pump port 56 of spool valve 30 is fluidly coupled to pump 12 through hydraulic fluid line 57, while a return or tank port 58 of the valve is fluidly coupled to tank 14 through hydraulic fluid line 59. Pump 12 is connected to receive hydraulic fluid from tank 14 through hydraulic fluid line 61. First, second and third pump passages 70, 72 and 74, respectively, fluidly couple pump port 56 to chamber 38. First and second tank passages 76 and 78, respectively, fluidly couple tank port 58 to chamber 38. Chamber 38 is fluidly coupled to rod end 48 of boost cylinder 32 through rod end port 60 and rod passage 62. Similarly, the chamber 38 is fluidly coupled to base end 50 of boost cylinder 32 through base end port 64 and base passage 66.

Valve spool 40 has first and second opposite ends 80 and 82, respectively, and a bore 84 which extends through the spool between the opposite ends. Linkage assembly 24 includes a cable 27 having opposite ends mechanically connected to the steering wheel 22 and tiller 26, and a housing 28 which surrounds the portion of the cable which extends between the steering wheel and hydraulic system 10. An end 86 of linkage housing 28 is mechanically connected to the end 80 of spool 40 by threaded coupler 88. Linkage cable 27 freely and movably extends through bore 84 of the valve spool 40 before being pivotally connected to tiller 26. The rotation of steering wheel 22 therefore causes cable 27 to force tiller 26 through steering strokes.

Switch 34 is mounted to valve 30 in the embodiment shown, and includes an electrical contact member 91, ball 92, rod 94 and spring (not shown). A detent or cammed recess 90 is located in valve spool 40 at a position which is adjacent to switch 34 when the valve spool is in the neutral position. The spring biases switch 34 to an electrically open state when valve spool 40 is in the neutral position. Ball 92 and rod 94 function as an actuator for contact member 91, and force switch 34 to an electrically closed state when valve spool 40 is moved to its extended or retracted positions.

Pump 12 includes and is driven by an electric motor (not separately shown), which is coupled to the boat battery 96 or other appropriate power source by pump switch 34. Pump 12 is therefore switched on when switch 34 is in the electrically closed state, and switched off when the switch is in the electrically open state.

The forces exerted on tiller 26 by linkage cable 27 during steering strokes are mechanically sensed by valve spool 40 in conjunction with cable housing 28 and centering spring 42. Whenever steering forces are applied to tiller 26 by cable 27, reactive forces generally equal in magnitude but opposite in direction to the steering forces are applied to valve spool 40 by linkage housing 28. In effect, the reactive forces are proportional to the steering wheel-applied mechanical steering forces. If these reactive forces are greater than the power-assist threshold force of centering spring 42, valve spool 40 will be forced out of the neutral position to either the retracted or extended positions. The motion of valve spool 40 to either the retracted or extended positions also forces ball 92 out of cammed recess 90 to actuate switch 34 and turn on pump 12. Conversely, valve spool 40 will return to the neutral position under the force of centering spring 42 when the reactive forces decrease to values which are less than or equal to the power-assist threshold. Pump switch 34 also switches pump 12 off when the valve spool 40 returns to the neutral position.

The operation of hydraulic system 10 when valve spool 40 is in the neutral position can be described with reference to FIG. 2. As described above, spool valve spool 40 will be biased to the neutral position by centering spring 42 whenever the steering forces being exerted on tiller 26 by linkage cable 27 are less than the power-assist threshold force (e.g., when the driver is maintaining a straight course or otherwise not turning steering wheel 22). In the embodiment shown, valve spool 40 and chamber 38 are configured in such a manner that lands 100 and 102 of the valve spool are positioned over the rod end port 62 and base end port 64, respectively, to fluidly isolate both the rod end 48 and base end 50 of boost cylinder 32 from the chamber when the spool is in the neutral position. The cammed recess 90 is also aligned with the rod 94 of pump switch 34, thereby causing the pump switch to be in an electrically open state. Pump 12 is therefore off and will not pump hydraulic fluid to spool valve 30. As a result, only the steering forces exerted on tiller 26 through the rotation of steering wheel 22 will move the tiller when the steering forces are less than the power-assist threshold.

Figure 3:
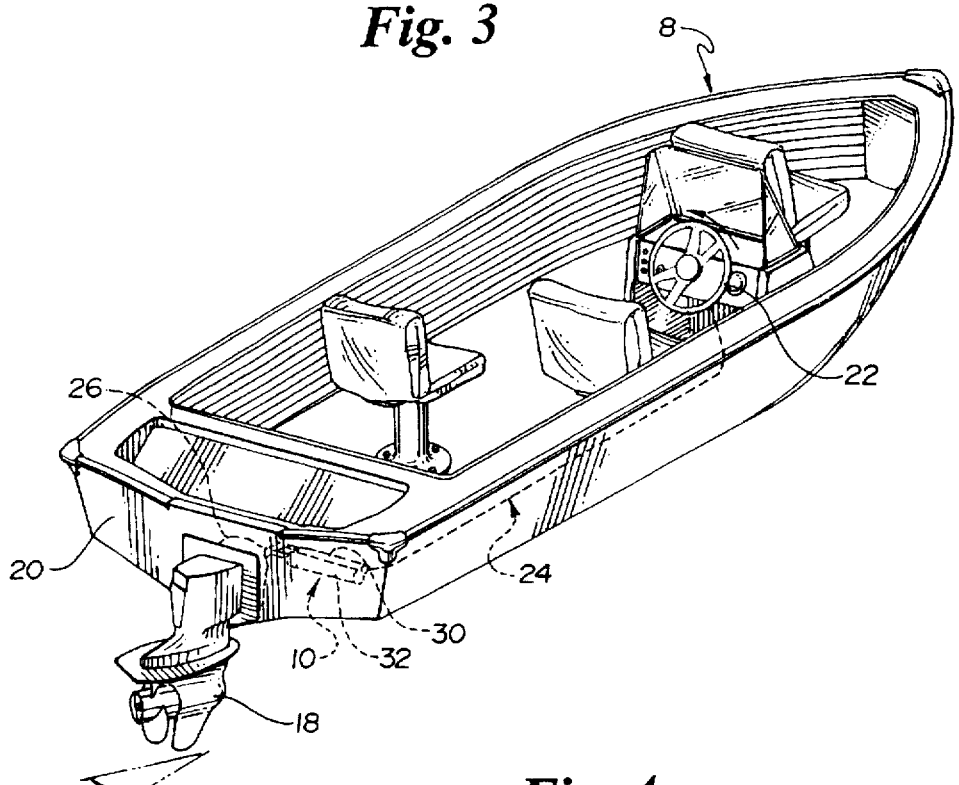
FIG. 3 is an illustration of the boat and hydraulic steering system shown in FIG. 1, with the hydraulic valve and cylinder shown in the retracted position.
Figure 4:
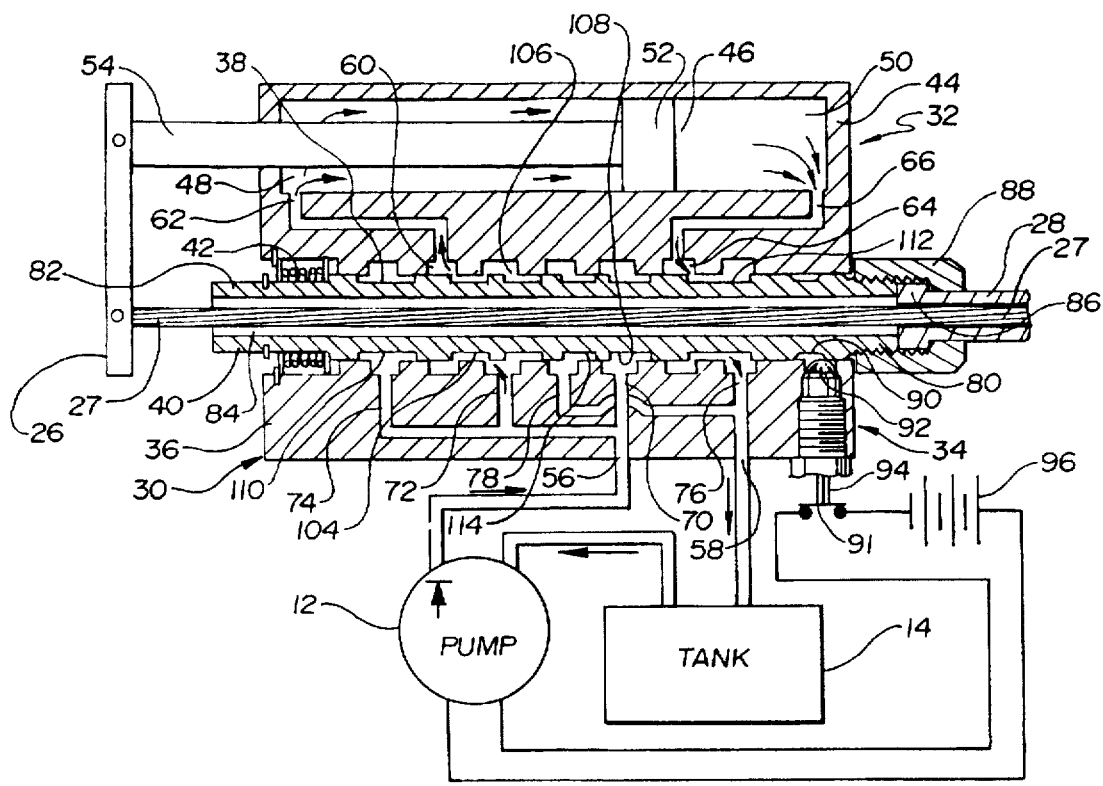
FIG. 4 is a schematic diagram of the hydraulic system shown in FIG. 3, illustrating the operation of the system when the valve is in the retracted position.

As shown in FIGS. 3 and 4, the counterclockwise rotation of steering wheel 22 retracts linkage cable 27 and forces tiller 26 through a right turn steering stroke. If the reactive forces exerted by linkage housing 28 on valve spool 40 during this steering stroke are greater than the power-assist threshold, the valve spool will be forced to the retracted position shown in FIG. 4. Pump switch 34 is also switched to its closed state and turns on pump 12 when valve spool 40 is in the retracted position.

Chamber 38 and valve spool 40 are configured in such a manner that when the spool is in the retracted position, valleys 104 and 106 fluidly couple second pump passage 72 to rod end port 60, while valleys 108 and 110 fluidly isolate first and third pump passages 70 and 74, respectively, from any other ports and passages of hydraulic system 10. A pressurized hydraulic fluid flow path is therefore established between pump port 56 of valve 30 and rod end port 60 of boost cylinder 32. Chamber 38 and valve spool 40 are also configured in such a manner that valley 112 fluidly couples base end port 64 to first tank passage 76, while valley 114 fluidly isolates the second tank passage 78 from other ports and passages of hydraulic system 10. A return hydraulic fluid flow path is therefore established between base end port 64 of boost cylinder 32 and tank port 58 of valve 30 when spool 40 is in the retracted position.

Since pump 12 is turned on when the valve spool 40 is in the retracted position, pressurized hydraulic fluid from pump 12 will flow into the rod end 48 of boost cylinder 32 through valve 30. Piston 52 and rod 54 are thereby forces through a retraction stroke (i.e., in a first stroke direction) to apply power-assist retraction steering forces to tiller 26. Hydraulic fluid forced from the base end 50 of boost cylinder 32 during the retraction stroke of piston 52 flows back to tank 14 through valve 30.

Figure 5:
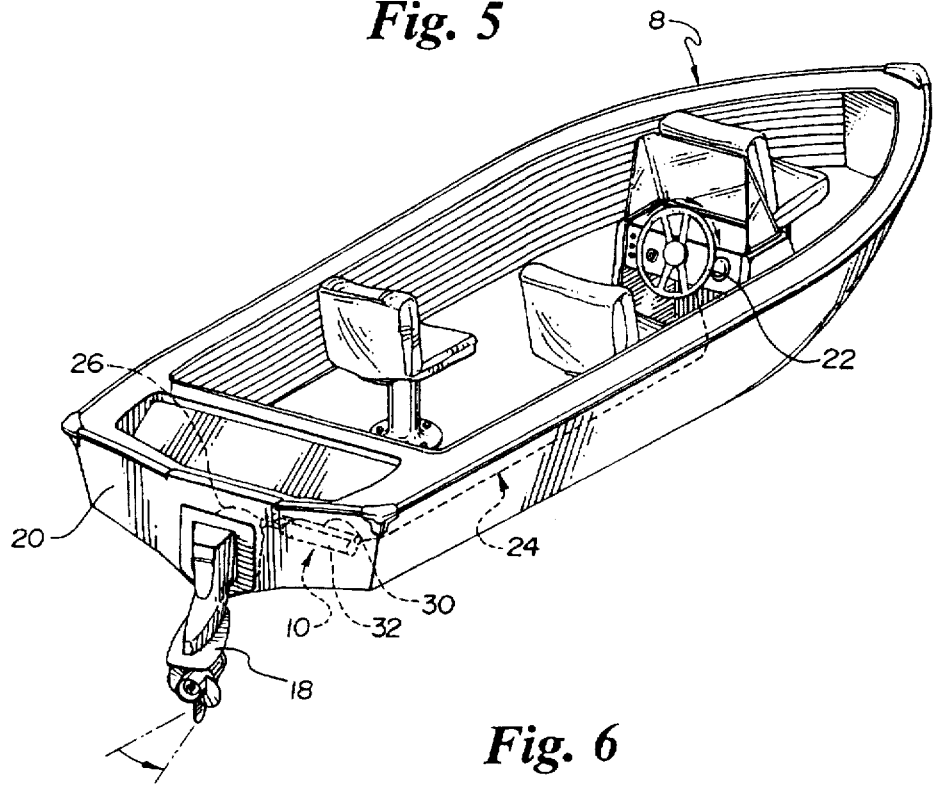
FIG. 5 is an illustration of the boat and hydraulic steering system shown in FIG. 1, with the hydraulic valve and cylinder shown in the extended position.
Figure 6:
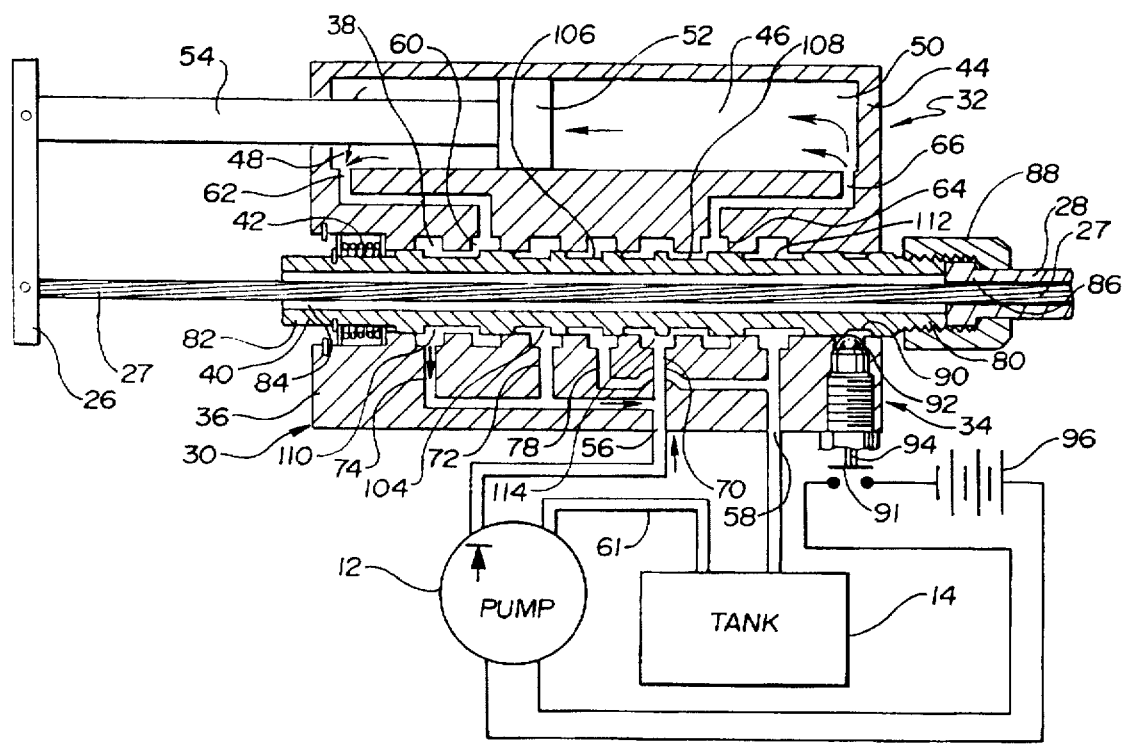
FIG. 6 is a schematic diagram of the hydraulic system shown in FIG. 5, illustrating the operation of the system when the valve is in the extended position.

As shown in FIGS. 5 and 6, the clockwise rotation of steering wheel 22 extends linkage cable 27 and forces tiller 26 through a left turn steering stroke. If the reactive forces exerted by linkage housing 28 on valve spool 40 during this steering stroke are greater than the power-assist threshold, the valve spool will be forced to the extended position shown in FIG. 6. Pump switch 34 is also switched to its closed state and turns on pump 12 when valve spool 40 is in the extended position.

Chamber 38 and valve spool 40 are configured in such a manner that when the spool is in the extended position, valleys 108 and 114 fluidly couple first pump passage 70 to base end port 64 of boost cylinder 32, and valley 110 fluidly couples rod end port 48 of the boost cylinder to third tank passage 74. Valley 104 fluidly isolates second tank passage 72 from the other ports and passages of hydraulic system 10 when the valve spool 40 is in the extended position. A pressurized hydraulic fluid flow path is therefore established between pump port 56 of valve 30 and the base end port 64 of boost cylinder 32, and a regenerative fluid flow path is established between the rod end port 60 of the boost cylinder and the first pump passage 70 of the valve. Chamber 38 and valve spool 40 are also configured in such a manner that valleys 112 and 106 fluidly isolate the first and second tank passages 76 and 78, respectively, from the other ports and passages of hydraulic system 10 when valve spool 40 is in the extended position. There is, therefore, no return hydraulic fluid flow path from valve 30 or boost cylinder 32 to tank 14 when the valve spool 40 is in the extended position.

Since pump 12 is turned on when valve spool 40 is in the extended position, pressurized hydraulic fluid from the pump will flow into the base end 50 of boost cylinder 32 through valve 30. Piston 52 and rod 54 are thereby forced through an extension stroke (i.e., in a second stroke direction) and apply power-assist extension steering forces to tiller 26. Hydraulic fluid forced from the rod end 48 of boost cylinder 32 during the extension stroke of piston 52 flows back to first pump passage 70 and joins the pressurized hydraulic fluid provided by pump 12 to create a regenerative hydraulic circuit. The amount of hydraulic fluid provided to the base end 50 of boost cylinder 32 during the extension stroke is therefore greater than the amount of hydraulic fluid provided to the rod end 48 of the boost cylinder during the retraction stroke. In the embodiment shown, the effective surface area of piston 52 on rod end 48 is one-half the surface area of the piston on base end 50 (i.e., the cross sectional area of rod 54 is one-half of the area of the piston on the base end). This regenerative circuit arrangement causes the power-assist steering forces exerted by boost cylinder 32 on tiller 26 during both retraction and extension strokes to be equal to one another. The "feel" of hydraulic system 10 to the driver is therefore the same for both clockwise and counterclockwise rotation of the steering wheel 22.

As described above, a hydraulic fluid flow path is established between the base end 50 of boost cylinder 32 and tank 14 when the valve spool 40 is in the retracted position. A fluid flow path is also established between the base end 50 and rod end 48 of boost cylinder 32 when spool valve 40 is in the extended position. Hydraulic system 10 therefore allows the driver to manually steer boat 8 by rotating steering wheel 22, even if pump 12 fails or if for other reasons the system is unable to generate power-assist steering forces.

FIGS. 7–9 are detailed views of one embodiment of hydraulic system 10. Features of valve 30, boost cylinder 32 and switch 34 in FIGS. 7–9 which are the same as or functionally equivalent to those described above with reference to FIGS. 1–6 are identified by common reference numerals. Valve 30 and boost cylinder 32 are mounted to one another in an assembly by bolts (not visible). O-rings 120 and 122 provide a seal between valve spool 40 and chamber 38 on the opposite ends of valve 30. Switch 40 is threadedly mounted to a bore in valve body 36. For efficiency and accuracy of manufacture, valve 30 includes a pair of sleeves or cages 124 and 126 which extend between spool 40 and valve body 36 in chamber 38. Construction bores 127, 128, 129 and 130 machined for passages 78, 78, 72 and 74, respectively, are plugged with balls 132. The hydraulic system 10 shown in FIGS. 7–9 can be used in connection with a miniature 12-volt pump such as the Model 2500 pump available from Oildyne of Minneapolis, Minn. The hydraulic system 10 can be configured to use the pump 12 at maximum efficiency operating conditions (e.g., full flow at working pressure).

Although hydraulic steering system 10 has been described with reference to preferred embodiments, those skilled in the art will recognized that changes can be made in form and detail without departing from the spirit and scope of the invention. By way of example, a hydraulic system which functions in the manner described and claimed herein can be implemented in a wide variety of known or otherwise available assembly arrangements. A regenerative hydraulic circuit would not be needed to provide retraction and extension steering forces of equal magnitude if a boost cylinder having a pair of rods extending from its opposite end is used. The width of the cammed recess can be increased to provide a greater range of manual steering operation before the switch is actuated and power-assist steering forces are provided. The power-assist steering forces would therefore not be provided when the operator is making short steering strokes to maintain a straight course (i.e., to correct for wander), or in the middle of a turn (i.e., after the turning radius has been selected and before returning to a straight-ahead course). Other mechanical, electrical and/or hydraulic arrangements can also be used to sense the forces exerted on the tiller, and to actuate the valve spool when the forces are greater than the power-assist threshold. For example, a pilot valve coupled to a force sensor can be used to actuate the valve spool. The hydraulic system can also be used in land vehicles and other applications.

What is claimed is:

1. A power-assisted hydraulic system for use in connection with a linkage having an end mechanically coupled to an actuated member and mounted within a housing having an end, a hydraulic pump and a tank of hydraulic fluid coupled to the pump, the power-assisted hydraulic system including:
   a switch responsive to forces applied to the actuated member by the linkage, for actuating the pump and initiating hydraulic fluid flow when the forces applied to the actuated member by the linkage are greater than a power-assist threshold force;
   hydraulic boost cylinder having a rod configured for interconnection to the actuated member, a base end port and a rod end port;
   a hydraulic spool valve comprising:
      a valve body, including:
         a spool chamber;
         a pump port and passage for fluidly coupling hydraulic fluid from the pump to the spool chamber;
         a base end port and passage for fluidly coupling hydraulic fluid between the spool chamber and the base end port of the boost cylinder; and
         a rod end port and passage for fluidly coupling hydraulic fluid between the spool chamber and the rod end port of the boost cylinder; and
      a spool mounted within the spool chamber and responsive to forces applied to the actuated member by the linkages for motion between a neutral position and first and second actuated positions when the forces applied to the actuated member by the linkage are greater than the power-assist threshold force, wherein:
         the spool has an aperture through which the link can extend and a mount for receiving the end of the housing;
         the spool and spool chamber are configured to fluidly couple the pump port and passage to the rod end port and passage and cause the boost cylinder to be driven in a first stroke direction when the spool is forced to the first actuated position; and
         the spool and spool chamber are configured to fluidly couple the pump port and passage to the base end port and passage and cause the boost cylinder to be driven in a second stroke direction when the spool is forced to the second actuated position.

2. The power-assisted hydraulic system of claim 1 wherein:
   the valve body further includes a tank port and passage for fluidly coupling hydraulic fluid from the spool chamber to the tank; and
   the spool and spool chamber are configured to fluidly couple the base end port and passage to the tank port and passage when the spool is forced to the first actuated position.

3. The power-assisted hydraulic system of claim 2 wherein the spool and spool chamber are further configured to fluidly isolate the tank port and passage from the base end port and passage and the rod end port and passage, and to fluidly couple the rod end port and passage to the pump port and passage in a regenerative hydraulic circuit, when the spool is forced to the second actuated position.

4. The power-assisted hydraulic system of claim 3 wherein the spool and spool chamber are further configured to fluidly isolate the base end port and passage and the rod end port and passage from the pump port and passage and the tank port and passage when the spool is in the neutral position.

5. The power-assisted hydraulic system of claim 4 wherein the spool valve further includes a centering spring for biasing the spool to the neutral position with the power-assist threshold force, and wherein the first and second actuated positions are on opposite sides of the neutral position.

6. The power-assisted hydraulic system of claim 5 wherein the switch is mounted to the valve body and is responsive to the position of the spool within the spool chamber, the switch being actuated when the spool is in the first and second actuated positions.

7. The power-assisted hydraulic system of claim 1 wherein the spool valve further includes a centering spring for biasing the spool to the neutral position with the power-assist threshold force, and wherein the first and second actuated positions are on opposite sides of the neutral position.

8. The power-assisted hydraulic system of claim 7 wherein the switch is mounted to the valve body and is responsive to the position of the spool within the spool chamber, the switch being actuated when the spool is in the first and second actuated positions.

9. The power-assisted hydraulic system of claim 1 wherein:
   the valve body further includes a tank port and passage for fluidly coupling hydraulic fluid from the spool chamber to the tank; and
   the spool and spool chamber are configured to fluidly couple the base end port and passage to the tank port and passage when the spool is in the first actuated position.

10. The power-assisted hydraulic system of claim 9 wherein:
    the hydraulic pump is fluidly coupled to the pump port and passage of the valve body; and
    the tank of hydraulic fluid is fluidly coupled to the tank port and passage of the valve body;
    and further including:
    an electric motor for driving the hydraulic pump; and
    a battery coupled to the electric motor by the switch, for powering the electric motor.

11. The power-assisted hydraulic system of claim 1 wherein:
    the hydraulic pump is fluidly coupled to the pump port and passage of the valve body;
    and further including
    an electric motor for driving the hydraulic pump; and
    a battery coupled to the electric motor by the switch, for powering the electric motor.

12. A boat having a steering system which includes a power-assisted hydraulic system, a linkage having and end mechanically coupled to an actuated member and mounted within a housing having an end, a hydraulic pump and a tank of hydraulic fluid coupled to the pump, the power-assisted hydraulic system comprising:

a switch responsive to forces applied to the actuated member by the linkage, for actuating the pump and initiating hydraulic fluid flow when the forces applied to the actuated member by the linkage are greater than a power-assist threshold force;

a hydraulic boost cylinder having a rod configured for interconnection to the actuated member, a base end port and a rod end port;

a hydraulic spool valve comprising:
  a valve body, including:
    a spool chamber,
    a pump port and passage for fluidly coupling hydraulic fluid from the pump to the spool chamber;
    a base end port and passage for fluidly coupling hydraulic fluid between the spool chamber and the base end port of the boost cylinder; and
    a rod end port and passage for fluidly coupling hydraulic fluid between the spool chamber and the rod end port of the boost cylinder, and
  a spool mounted within the spool chamber and responsive to forces applied to the actuated member by the linkage, for motion between a neutral position and first and second actuated positions when the forces applied to the actuated member by the linkage are greater than the power-assist threshold force, wherein:
    the spool has an aperture through which the linkage can extend and a mount for receiving the end of the housing; and
    the spool and spool chamber are configured to fluidly couple the pump port and passage to the rod end port and passage and cause the boost cylinder to be driven in a first stroke direction when the spool is forced to the first actuated position; and
    the spool and spool chamber are configured to fluidly coupled the pump port and passage to the base end port and passage and cause the boost cylinder to be driven in a second stroke direction when the spool is forced to the second actuated position and the hydraulic pump is fluidly coupled to the pump port and passage of the valve body, an electric motor for driving the hydraulic pump; and a battery coupled to the electric motor by the switch, for powering the electric motor.

13. A power-assisted hydraulic steering system for use in connection with a steering linkage extending through a housing and coupled to a vehicle steering actuator, an electrically actuated hydraulic pump, and a tank of hydraulic fluid coupled to the pump, the power-assisted hydraulic steering system including:

a hydraulic cylinder having a rod configured for interconnection to the vehicle steering actuator, a base end port and a rod end port;

a hydraulic spool valve, comprising:
  a valve body, including:
    a spool chamber;
    a pump port and passage for fluidly coupling hydraulic fluid from the pump to the spool chamber;
    a base end port and passage for fluidly coupling the spool chamber to the base end port of the boost cylinder; and
    a rod end port and passage for fluidly coupling the spool chamber to the rod end port of the boost cylinder;
  a spool mounted within the chamber for reciprocal motion between a neutral position, an extended position and a retracted position in response to forces greater than a power-assist threshold force between the steering actuator and the linkage housing when the steering linkage is actuated, the spool including:
    a housing mount on an end of the spool, for mounting the spool to the steering linkage housing; and
    a bore extending through the spool and configured to have the steering linkage extending therethrough; and
  a centering spring for biasing the spool to the neutral position within the valve body with the power-assist threshold force; and
a switch responsive to the position of the spool, for actuating the hydraulic pump when the spool is in the extended and retracted positions; and wherein
the spool and spool chamber are configured to fluidly couple the pump port and passage to the rod end port and passage when the spool is in the retracted position, to retract the rod of the hydraulic cylinder when the steering linkage is actuated to retract the steering actuator and the forces between the steering actuator and linkage housing are greater than the power-assist threshold force; and
the spool and spool chamber are configured to fluidly couple the pump port and passage to the base end port and passage when the spool is in the extended position, to extend the rod of the hydraulic cylinder when the steering linkage is actuated to extend the steering actuator and the forces between the steering actuator and linkage housing are greater than the power-assist threshold force.

14. The power-assisted hydraulic steering system of claim 13 wherein:
  the valve body further includes a tank port and passage for fluidly coupling hydraulic fluid from the spool chamber to the tank; and
  the spool and spool chamber are configured to fluidly couple the base end port of the hydraulic cylinder to the spool chamber when the spool is in the retracted position.

15. The power-assisted hydraulic steering system of claim 14 wherein the spool and spool chamber are further configured to fluidly isolate the tank port and passage from the base end port and passage and the rod end port and passage, and to fluidly couple the rod end port and passage to the pump port and passage in a regenerative hydraulic circuit, when the spool is in the extended position.

16. The power-assisted hydraulic steering system of claim 15 wherein the spool and spool chamber are further configured to fluidly isolate the rod end port and passage and the base end port and passage from the tank port and passage and the pump port and passage when the spool is in the neutral position.

17. A power-assist hydraulic system for use in connection with a linkage extending through a housing and mechanically coupled to an actuated member, including:
  a hydraulic boost cylinder having a rod configured for interconnection to the actuated member;
  a hydraulic valve member having ports fluidly interconnected to the boost cylinder; and
  a spool mounted within the valve member for motion between a neutral position and first and second actuated positions in response to forces between the linkage and housing, including:
    a bore through which the linkage can extend; and
    a mount for connecting the spool to the end of the housing; and wherein the spool and hydraulic valve member cooperate to cause the boost cylinder to drive the rod in a first stroke direction when the spool is in the first actuated position, and to cause the boost cylinder to drive the rod in a second stroke direction when the spool is in the second actuated position.

18. The power-assist hydraulic system of claim 17 and further including a source of pressurized hydraulic fluid coupled to the valve member.

19. The power-assist hydraulic system of claim 18 and further including the linkage and the housing, wherein the linkage extends through the bore of the spool and an end of the housing is mounted to the spool.

20. The power-assist hydraulic system of claim 19 wherein the linkage includes a flexible cable.

21. A boat having a steering system which includes a power-assist hydraulic system, a tiller, a steering linkage mounted within a housing and having an end connected to the tiller, and a source of pressurized hydraulic fluid, the power-assist hydraulic system comprising:
- a hydraulic boost cylinder having a rod connected to the tiller;
- a hydraulic valve member having ports fluidly interconnected to the boost cylinder and source of pressurized hydraulic fluid; and
- a spool mounted within the valve member for motion between a neutral position and first and second actuated positions in response to forces between the steering linkage and housing, wherein:
  the spool includes a bore through which the steering linkage extends;
  an end of the housing is connected to the spool; and
  the spool and hydraulic valve member cooperate to cause the boost cylinder to drive the rod in a first stroke direction when the spool is in the first actuated position, and to cause the boost cylinder to drive the rod in a second stroke direction when the spool is in the second actuated position.

22. The boat of claim 21 wherein the steering linkage includes a flexible cable extending through the sleeve.

23. The power-assisted hydraulic system of claim 1 wherein the linkage and the rod of the hydraulic cylinder are transversely spaced and connected to the actuated member at spaced-apart locations.

24. The boat of claim 12 wherein the linkage and the rod of the hydraulic cylinder are transversely spaced and connected to the actuated member at spaced-apart locations.

25. The power-assisted hydraulic system of claim 13 wherein the linkage and the rod of the hydraulic cylinder are transversely spaced and connected to the steering actuator at spaced-apart locations.

26. The power-assisted hydraulic system of claim 17 wherein the linkage and the rod of the hydraulic cylinder are transversely spaced and connected to the actuated member at spaced-apart locations.

27. The boat of claim 21 wherein the linkage and the rod of the hydraulic cylinder are transversely spaced and connected to the tiller at spaced-apart locations.

* * * * *

UNITED STATES PATENT AND TRADEMARK OFFICE
CERTIFICATE OF CORRECTION

PATENT NO. : 5,775,102
DATED : July 7, 1998
INVENTOR(S) : Frye et al.

It is certified that error appears in the above-indentified patent and that said Letters Patent is hereby corrected as shown below:

Column 7, line 23, before hydraulic insert --a--

Column 7, line 44, delete "link" and insert therefor --linkage--

Column 8, line 63, delete "and" and insert therefor --an--

Column 9, line 36, delete "coupled" and insert therefor --couple--

Signed and Sealed this

Twenty-third Day of February, 1999

Attest:

Q. TODD DICKINSON

*Attesting Officer*     *Acting Commissioner of Patents and Trademarks*